(12) United States Patent
Qiu

(10) Patent No.: US 11,086,164 B2
(45) Date of Patent: Aug. 10, 2021

(54) LOGIC BOARD ASSEMBLY, DISPLAY DEVICE AND LIQUID CRYSTAL DISPLAY

(71) Applicants: HKC Corporation Limited, Guangdong (CN); Chongqing HKC Optoelectronics Technology Co., Ltd., Chongqing (CN)

(72) Inventor: Bin Qiu, Guangdong (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 334 days.

(21) Appl. No.: 16/278,754

(22) Filed: Feb. 19, 2019

(65) Prior Publication Data

US 2020/0103702 A1    Apr. 2, 2020

Related U.S. Application Data

(63) Continuation of application No. PCT/CN2018/116936, filed on Nov. 22, 2018.

(30) Foreign Application Priority Data

Sep. 30, 2018   (CN) .......................... 201811165983.9

(51) Int. Cl.
  *G02F 1/13357* (2006.01)
  *G06F 1/18* (2006.01)
  (Continued)

(52) U.S. Cl.
  CPC .... *G02F 1/133602* (2013.01); *G02F 1/13306* (2013.01); *G06F 1/184* (2013.01);
  (Continued)

(58) Field of Classification Search
  CPC ................................................ G02F 1/133602
  See application file for complete search history.

(56) References Cited

U.S. PATENT DOCUMENTS

| | | | |
|---|---|---|---|
| 10,050,365 B1* | 8/2018 | Ju ........................ | H01R 13/648 |
| 2013/0280947 A1* | 10/2013 | Matoba ................ | H01R 12/774 |
| | | | 439/372 |
| 2019/0113691 A1* | 4/2019 | Konegawa ........... | G02B 6/3885 |

FOREIGN PATENT DOCUMENTS

| | | |
|---|---|---|
| CN | 101145643 A | 3/2008 |
| CN | 102738614 A | 10/2012 |

(Continued)

*Primary Examiner* — Sang V Nguyen

(57) ABSTRACT

The present disclosure discloses a logic board assembly, a display device, and a liquid crystal display, the logic board assembly comprising a connection cable, a printed circuit board, a connector disposed on the printed circuit board, a timing controller, and a power chip, wherein the connection cable is pluggably connected to the connector, and the connection cable has a first state in good contact with the connector and a second state in abnormal contact therewith; the timing controller includes a detecting device and a control device, the detecting device configured to detect a state of the connector, the control device electrically connected to the power chip of the logic board assembly; when the connection cable is in the first state, the control device controls the power chip to be turned on, and when in the second state, the control device controls the power chip to be turned off.

8 Claims, 3 Drawing Sheets

(51) Int. Cl.

|  |  |
|---|---|
| *H01R 13/66* | (2006.01) |
| *G02F 1/133* | (2006.01) |
| *H01R 13/64* | (2006.01) |
| *G09G 3/20* | (2006.01) |
| *G06F 1/16* | (2006.01) |
| *H01R 13/703* | (2006.01) |

(52) U.S. Cl.
CPC ........... *H01R 13/64* (2013.01); *H01R 13/665* (2013.01); *G06F 1/1601* (2013.01); *G06F 1/1637* (2013.01); *G06F 2200/1612* (2013.01); *G09G 3/2092* (2013.01); *G09G 2300/0426* (2013.01); *H01R 13/7031* (2013.01)

(56) References Cited

FOREIGN PATENT DOCUMENTS

| CN | 103311734 | A |   | 9/2013 |  |
|----|-----------|---|---|--------|--|
| CN | 103825155 | A |   | 5/2014 |  |
| CN | 206004084 |   | * | 3/2017 | ............ H01R 13/64 |
| CN | 206004084 | U |   | 3/2017 |  |
| CN | 207781160 |   | * | 8/2018 |  |
| JP | 2010140687 | A |  | 6/2010 |  |
| JP | 2015079568 | A |  | 4/2015 |  |

\* cited by examiner

LOGIC BOARD ASSEMBLY, DISPLAY DEVICE AND LIQUID CRYSTAL DISPLAY

CROSS REFERENCE TO RELATED APPLICATIONS

The present application is a Continuation Application of PCT Application No. PCT/CN2018/116936 filed on Nov. 22, 2018, which claims the benefit of Chinese Patent Application No. 201811165983.9 filed on Sep. 30, 2018. All the above are hereby incorporated by reference.

FIELD OF THE DISCLOSURE

The present application relates to the technical field of liquid crystal display, in particular, to a logic board assembly, a display device and a liquid crystal display.

BACKGROUND OF THE DISCLOSURE

At present, with the development of the large-size, high-resolution direction of the liquid crystal television, the size of the connector connecting the driving board with the liquid crystal display panel is becoming larger and larger, and the pins are more and more. In the process of manually assembling the connector and the driving board, it is difficult to judge whether it is assembled by the naked eye, meanwhile, the FFC (Flexible Flat Cable) connection cable used with the connector is also wider and wider, which will bring difficulty to the assembly and easily cause the FFC to be inserted askew or loosened. Inserting askew may cause the LCD panel to display abnormally, and may cause the LCD panel or the driving chip to burn out, and loosing may cause the display to be initially normal, while during transportation and use, the FFC may be caused to be loosen and askew, causing serious consequences.

SUMMARY OF THE DISCLOSURE

The main purpose of the present disclosure is to provide a logic board assembly for avoiding abnormality of the liquid crystal display panel or burning of the driving chip caused by abnormal connection of the connection cable and the connector.

To achieve the above purpose, the logic board assembly provided by the present disclosure comprises a connector; a connection cable pluggably connected to the connector, the connection cable having a first state in good contact with the connector and a second state in abnormal contact with the connector; and, a timing controller including a detecting device and a control device; the detecting device includes a signal transmitting end and a signal receiving end, and the signal transmitting end and the signal input end are electrically connected to the connector; the control device includes a signal input end and a signal output end, the signal input end being electrically connected to the detecting device, the signal output end being electrically connected to the power chip of the logic board assembly; when the connection cable is in the first state, the control device controls the power chip to be turned on; when the connection cable is in the second state, the control device controls the power chip to be turned off.

Optionally, wherein one of the connection cable and the connector is provided with a connecting member, and the other is provided with an adapter; when the connector is in the first state, the connector is electrically connected to the adapter to form a detection loop for the detection signal to circulate.

Optionally, the connector is a female head, and the connecting member includes a first contact and a second contact that are spaced apart on the female head; the first contact is electrically connected to the signal transmitting end, and the second contact is electrically connected to the signal receiving end; the connection cable is provided with a male head adapted to the female head, and the adapter is an electrical conductor disposed on the male head.

Optionally, the female head includes a casing, a slot for adapting and plugging the male head is formed in the casing, and a plurality of first pins are disposed in the casing; the male head includes a male body and a plurality of second pins disposed on the male body, and the plurality of second pins are respectively disposed corresponding to the plurality of first pins.

Optionally, the first contact and the second contact are protruded from an inner wall of the casing, and the electrical conductor is provided with a positioning slot that is adapted to be positioned with the first contact and the second contact.

Optionally, the height of the first contact and the second contact protruding from the inner wall ranges from 0.25 mm to 1.25 mm.

Optionally, a mounting slot is disposed on the male head body outside the second pin, and the electrical conductor is adaptively mounted in the mounting slot, so that the outer surface of the electrical conductor is disposed flush with the outer surface of the male head body.

Optionally, the electrical conductor includes an electrical conductor disposed in an elongated shape and two side electrical conductors disposed respectively at two ends of the electrical conductor and extending to one side; the mounting slot has a bottom wall and a side wall connected to the bottom wall, and an end surface of the two side electrical conductors away from the electrical conductor body abuts on the side wall.

Optionally, the positioning slot is opened on an end of the side electrical conductor away from the electrical conductor body.

The present disclosure further provides a display device, wherein the display device comprises a backlight module, a liquid crystal display panel and a logic board assembly, one end of the connection cable of the logic board assembly being pluggably connected to the connector, the other end of the connection cable being connected to a driving chip of the liquid crystal display panel, wherein the logic board assembly includes:

a connector; a connection cable pluggably connected to the connector, the connection cable having a first state in good contact with the connector and a second state in abnormal contact with the connector; and, a timing controller including a detecting device and a control device; the detecting device includes a signal transmitting end and a signal receiving end, and the signal transmitting end and the signal input end are electrically connected to the connector; the control device includes a signal input end and a signal output end, the signal input end being electrically connected to the detecting device, the signal output end being electrically connected to the power chip of the logic board assembly; when the connection cable is in the first state, the control device controls the power chip to be turned on; when the connection cable is in the second state, the control device controls the power chip to be turned off.

Optionally, wherein one of the connection cable and the connector is provided with a connecting member, and the other is provided with an adapter; when the connector is in the first state, the connector is electrically connected to the adapter to form a detection loop for the detection signal to circulate.

Optionally, the connector is a female head, and the connecting member includes a first contact and a second contact that are spaced apart on the female head; the first contact is electrically connected to the signal transmitting end, and the second contact is electrically connected to the signal receiving end; the connection cable is provided with a male head adapted to the female head, and the adapter is an electrical conductor disposed on the male head.

Optionally, the first contact and the second contact are protruded from an inner wall of the casing, and the electrical conductor is provided with a positioning slot that is adapted to be positioned with the first contact and the second contact.

The present disclosure further provides a liquid crystal display, wherein the display device comprises a backlight module, a liquid crystal display panel and a logic board assembly, one end of the connection cable of the logic board assembly being pluggably connected to the connector, the other end of the connection cable being connected to a driving chip of the liquid crystal display panel; wherein the logic board assembly includes:

a connector;

a connection cable pluggably connected to the connector, the connection cable having a first state in good contact with the connector and a second state in abnormal contact with the connector; and, a timing controller including a detecting device and a control device;

the detecting device includes a signal transmitting end and a signal receiving end, and the signal transmitting end and the signal input end are electrically connected to the connector;

the control device includes a signal input end and a signal output end, the signal input end being electrically connected to the detecting device, the signal output end being electrically connected to the power chip of the logic board assembly; when the connection cable is in the first state, the control device controls the power chip to be turned on; when the connection cable is in the second state, the control device controls the power chip to be turned off.

The logic board assembly provided by the present disclosure comprises a connection cable, a printed circuit board, a connector disposed on the printed circuit board, a timing controller, and a power chip; the connection cable is pluggably connected to the connector, the connection cable has a first state in good contact with the connector and a second state in abnormal contact with the connector; the timing controller includes a detecting device and a control device; the detecting device has a signal transmitting end and a signal receiving end, and the signal transmitting end and the signal input end are electrically connected to the connector; the control device has a signal input end and a signal output end, the signal input end being electrically connected to the detecting device, the signal output end being electrically connected to the power chip of the logic board assembly; when the connection cable is in the first state, the control device controls the power chip to be turned on; when the connection cable is in the second state, the control device controls the power chip to be turned off. As such, the logic board assembly provided by the present application may detect the reliability after the connector and the connection cable are connected, thereby avoiding the problem of abnormality of the liquid crystal display panel or burning of the driving chip caused by skew plugging and loosing connection of the connection cable and the connector.

BRIEF DESCRIPTION OF THE DRAWINGS

In order to illustrate the technical schemes in the embodiments of the present disclosure or in the exemplary art more clearly, the drawings which are required to be used in the description of the embodiments or the exemplary art are briefly described below. It is obvious that the drawings described below are only some embodiments of the present disclosure. It is apparent to those of ordinary skill in the art that other drawings may be obtained based on the structures shown in accompanying drawings without inventive effort.

DESCRIPTION OF THE REFERENCE NUMERALS

Figure 1:
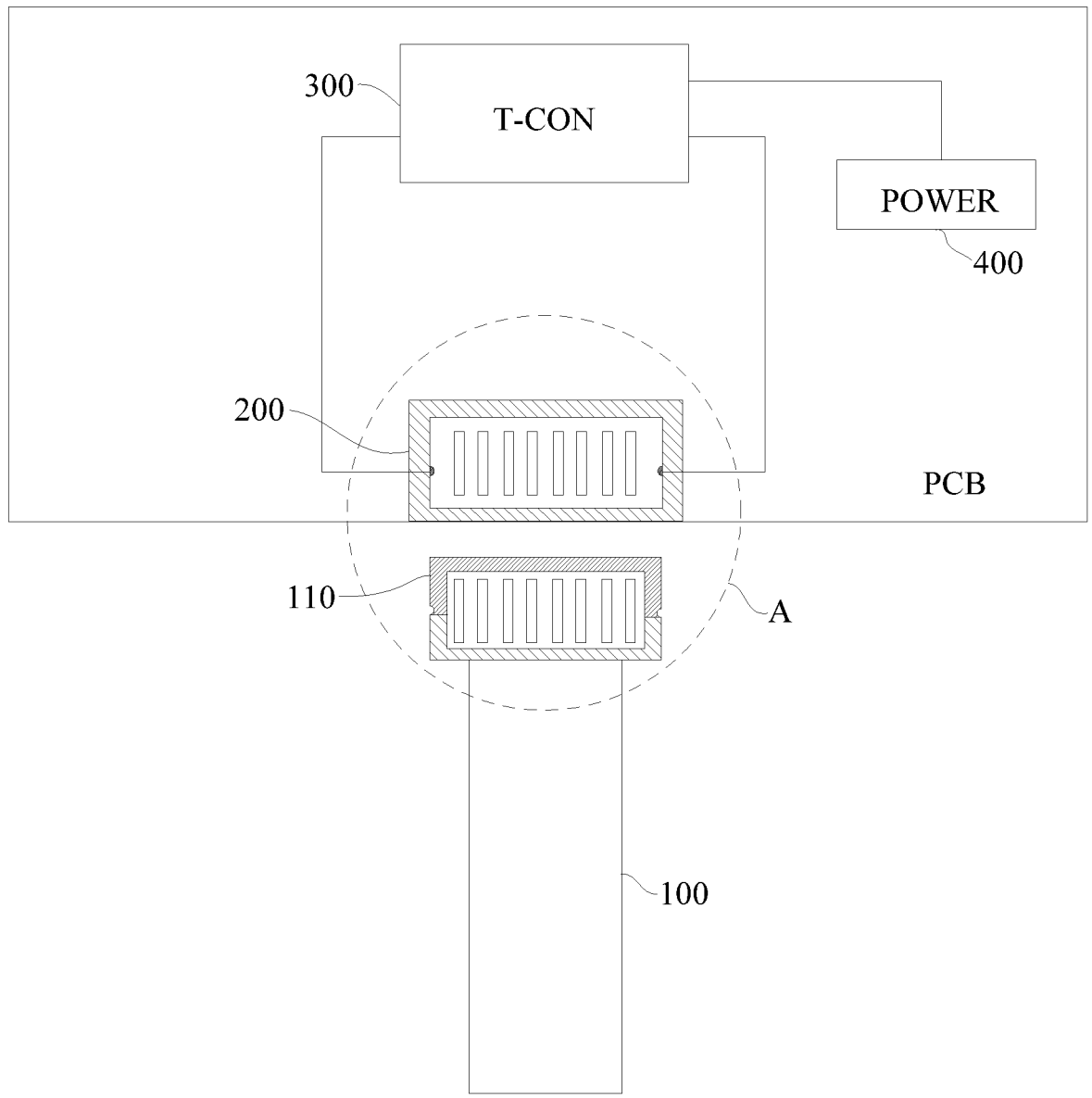
FIG. 1 is a structural view of an embodiment of the logic board assembly according to the present disclosure.

| Reference numeral | Name | numeral | Name |
|---|---|---|---|
| 100 | Connection cable | 220 | First pin |
| 200 | Connector | 310 | Detecting device |
| 300 | Timing controller | 320 | Control module |
| 400 | Power chip | 111 | Positioning slot |
| 110 | Electrical conductor | 211 | First contact |
| 120 | Male head body | 212 | Second contact |
| 130 | Second pin | 213 | Slot |
| 210 | casing | | |

With reference to the drawings, the implement of the object, features and advantages of the present disclosure will be further illustrated in conjunction with embodiments.

DETAILED DESCRIPTION OF THE EMBODIMENTS

The technical schemes of embodiments of the present disclosure will be clearly and completely described in the following with reference to the accompanying drawings. It is obvious that the embodiments to be described are only a part rather than all of the embodiments of the present disclosure. Based on the embodiments of the present disclosure, all the other embodiments obtained by those of ordinary skill in the art without inventive effort are within the scope of the present disclosure.

It is to be understood that, all of the directional instructions in the exemplary embodiments of the present disclosure (such as top, down, left, right, front, back) can only be used for explaining relative position relations, moving condition of the elements under a special form (referring to figures), and so on, if the special form changes, the directional instructions changes accordingly.

In addition, the descriptions, such as the "first", the "second" in the present disclosure, can only be used for describing the aim of description, and cannot be understood as indicating or suggesting relative importance or impliedly indicating the number of the indicated technical character. Therefore, the characteristics indicated by the "first", the "second" can express or impliedly include at least one of the characteristics. In addition, the technical schemes between the various embodiments may be combined with each other, provided that those skilled in the art can implement it, and when the combination of the technical schemes is contradictory or impossible to implement, it should be considered that the combination of these technical schemes does not exist, nor is it within the scope of protection required by the present disclosure.

The present disclosure provides a logic board assembly, which may detect the reliability after the connector and the connection cable are connected, thereby avoiding the problem of abnormality of the liquid crystal display panel or burning of the driving chip caused by skew plugging and loosing connection of the connection cable and the connector.

Figure 3:
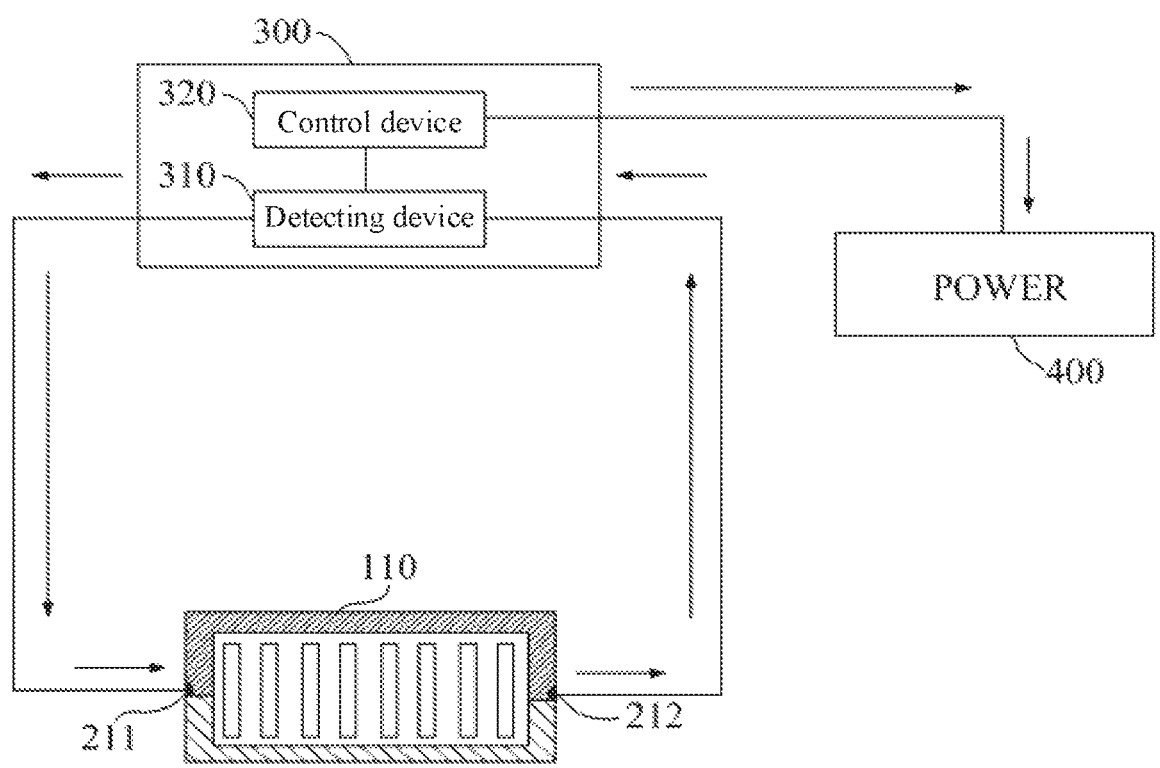
FIG. 3 is a structural view of a detection loop of the logic board assembly according to the present disclosure.

In a embodiment of the present disclosure, as shown in FIGS. 1 and 3, the logic board assembly comprises a connection cable 100, a PCB board (Printed circuit board), a connector 200 disposed on the printed circuit board, a T-CON (Timing Controller 300), and a POWER (power chip 400), wherein the connection cable 100 may be pluggably connected to the connector 200, the connection cable 100 has a first state in good contact with the connector 200 and a second state in abnormal contact with the connector 200; the timing controller 300 includes a detecting device 310 and a control device 320; the detecting device 310 has a signal transmitting end and a signal receiving end, and the signal transmitting end and the signal input end are electrically connected to the connector 200; the control device 320 has a signal input end and a signal output end, the signal input end being electrically connected to the detecting device 310, the signal output end being electrically connected to the power chip 400 of the logic board assembly; when the connection cable 100 is in the first state, the control device 320 controls the power chip 400 to be turned on; when the connection cable 100 is in the second state, the control device 320 controls the power chip 400 to be turned off.

Specifically, the present disclosure improves upon the timing controller 300 of the exemplary logic board. A detecting device 310 and a control device 320 are added to the timing controller 300, the detecting device 310 forms a detection loop with the connector 200 and the connection cable 100, and the control device 320 forms a control circuit with the power chip 400. Specifically, the detecting device 310 has a signal transmitting end and a signal receiving end, and the signal transmitting end and the signal input end are electrically connected to the connector 200. In this way, when the connection cable 100 is inserted into the connector 200 and the connection cable 100 is in good contact with the connector 200, the detection loop is turned on. When the connection cable 100 is not inserted into the connector 200, or the connection cable 100 is in abnormal contact with the connector 200 (for example, the connection cable 100 is inserted askew into the connector 200, the connection cable 100 is loosened in the connector 200, etc.), the detection loop is turned off. The control device 320 has a signal input end and a signal output end, the signal input end is electrically connected to the detecting device 310, and the signal output end is electrically connected to the power chip 400 of the logic board assembly. In this way, when the connection cable 100 is in the first state, that is, when the detection circuit is turned on, the control device 320 controls the power chip 400 to be turned on. When the connection cable 100 is in the second state, that is, when the detection circuit is turned off, the control device 320 controls the power chip 400 to be turned off.

Since the logic board assembly provided by the present application may detect the connection reliability of the connection cable 100 and the connector 200 through the detection loop, the detection loop is turned off, and the timing controller 300 controls the power to be turned off when the connection cable 100 is inserted askew into or disconnected with the connector 200, thereby preventing the display screen from being abnormal or the driving chip from being burnt.

It should be emphasized here that the present application has improved the exemplary timing controller 300 by adding the detecting device 310 and the control device 320 to the timing controller 300, thereby improving the integration of the logic board assembly. In the present embodiment, the connection cable 100 is an FFC (Flexible Flat Cable).

It should be noted here that the logic board is also called a T-CON board, a screen driver board, a center board. The logic board includes a PCB board, and a timing controller 300 and a connector 200 disposed on the PCB board. In the present application, the logic board assembly includes the logic board and a connection cable 100 that is pluggably connected to the connector 200 of the logic board. The detecting device 310 and the control device 320 may be both a detecting chip and a control chip, and may also detect the circuit and the control circuit. That is, the detecting device 310 only requires to be configured to have a detecting function, and the control device 320 only requires to be configured to have a control function. As for the hardware implemented, the present application does not limit this.

Further, referring to FIGS. 1 to 3, the detection loop formed after the connection cable 100 is inserted into the connector 200 will now be described in detail. In the present embodiment, one of the connection cable 100 and the connector 200 is provided with a connecting member, and the other is provided with an adapter; when the connector 200 is in the first state, the connector is electrically connected to the adapter to form a detection loop for the detection signal to circulate.

Specifically, the connector 200 is a female head, and the connecting member includes a first contact 211 and a second contact 212 that are spaced apart on the female head; the first contact 211 is electrically connected to the signal transmitting end, and the second contact 212 is electrically connected to the signal receiving end; the connection cable 100 is provided with a male head adapted to the female head, and the adapter is an electrical conductor 110 disposed on the male head. When the male head on the connection cable 100 is inserted into the female head on the connector 200, the connecting member may be in a good electrical connection in the adapter if the male and female heads are well connected, that is, the first contact 211 and the second contact 212 are electrically well connected to the electrical conductor 110. In this way, the detection loop is turned on, and the power chip 400 is normally powered. If the connection between the male head and the female head is abnormal, the connector and the adapter may not achieve a good electrical connection, that is, the first contact 211 and the second contact 212 are abnormally connected to the electrical conductor 110. In this way, the detection loop is turned off, and the power chip 400 may not be powered, thereby protecting the circuit to prevent the display screen from being abnormal or the driving chip from being burnt.

More importantly, as shown in FIG. 3, since the electrical conductor 110 is disposed on the male head of the connection cable 100 provided in the present application, and the female head of the connector 200 is provided with a first contact 211 and a second contact 212 that are electrically and adaptively connected to the electrical conductor 110, the electrical conductor 110 is electrically connected to the first contact 211 and the second contact 212 when the male head of the connection cable 100 is well connected to the female head of the connector 200, thereby making the detection loop to be turned on. Therefore, in the present application, the detection loop may be separated from the pins on the male or female heads. In other words, the logic board assembly provided in the present application does not require to add detecting signal pins on the male and female heads to form a detection loop. In this way, the following two advantages may be obtained: first, the number of pins may be avoided to be too large, and the volume of the male and female heads may be further prevented from being excessively large; second, the detection loop may be caused to be separated from the pins on the male and female heads to avoid interference between the detecting signals and the driving signals of the display screen on the pins.

However, the design of the present application is not limited thereto. In other embodiments, the electrical conductor 110 is disposed on the female head, and the first contact 211 and the second contact 212 are disposed on the male head.

Further, referring still to FIG. 2, the structure of the female and male heads will now be described in detail. The female head includes an outer casing 210 of an insulating material; a slot 213 is defined in the casing 210 for inserting the male head, and the casing 210 is provided with a plurality of first pins 220; the casing 210 of the female head is provided with a through hole for guiding the connecting line of the first contact 211 and the second contact 212; the male head includes a male head body of an insulating material and a plurality of second pins 130 spaced apart on the male head body, and the plurality of second pins 130 are disposed in one-to-one correspondence with the plurality of first pins 220.

Figure 2:
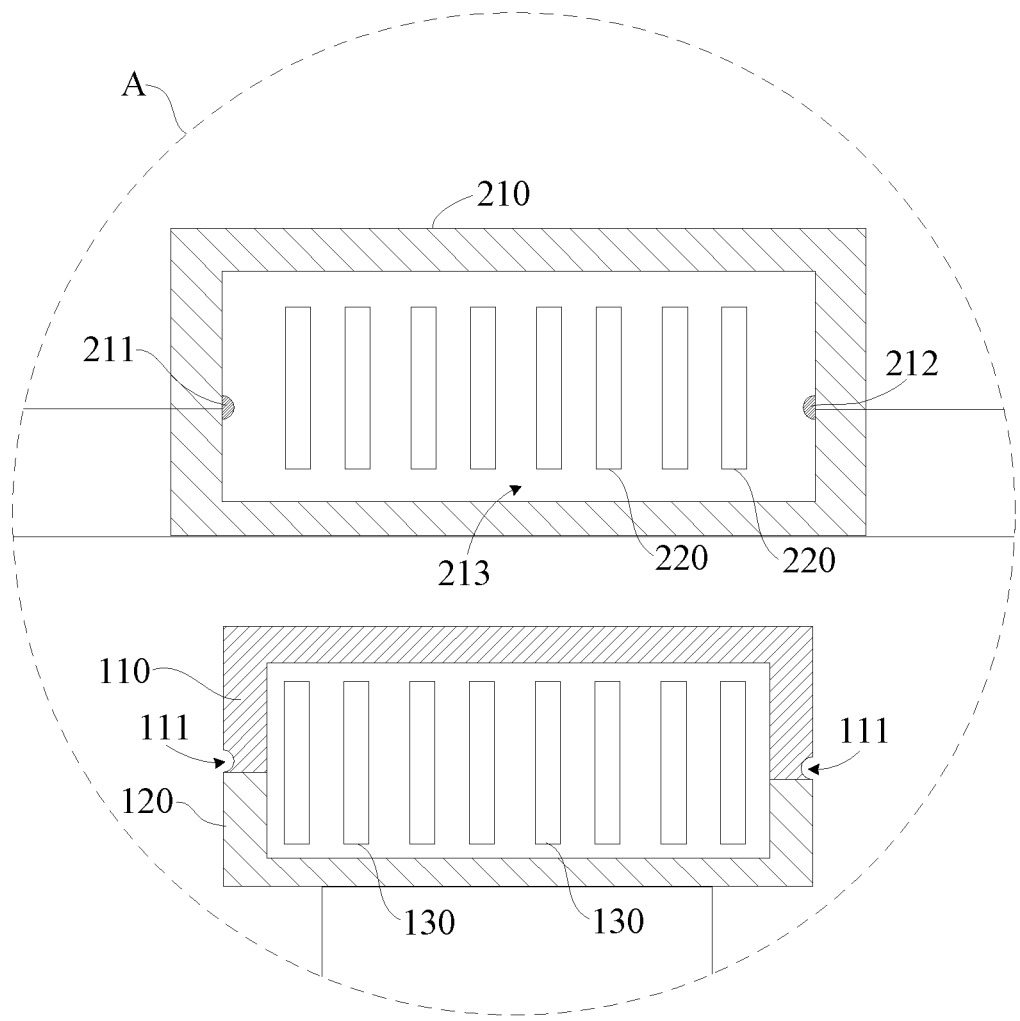
FIG. 2 is an partial enlarged view of A in FIG. 1.

Further, referring still to FIG. 2, in order to make the first contact 211 and the second contact 212 both maintain a stable electrical connection with the electrical conductor 110, in an embodiment of the present application, the first contact 211 and the second contact 212 are protruded from an inner wall of the casing 210, and the electric conductor 110 is provided with a positioning slot 111 which is adaptively positioned with the first contact 211 and the second contact 212. In this way, after the male head is adaptively inserted into the female head, the first contact 211 and the second contact 212 are embedded in the positioning slot 111. Thus, the connection strength between the male and the female heads may be further improved, and the connection cable 100 is prevented from being loose or skewed in the connector 200, so that the first contact 211 and the second contact 212 may both maintain a stable electrical connection with the electrical conductor 110.

Further, in order to ensure the connection strength between the first contact 211 and the second contact 212 and the positioning slot 111, the first contact 211 and the second contact 212 should have a suitable height. Specifically, in the present embodiment, the height of the first contact 211 and the second contact 212 protruding from the inner wall ranges from 0.25 mm to 1.25 mm. When the height of the first contact 211 and the second contact 212 ranges from 0.25 mm to 1.25 mm, the connection strength between the contacts (including the first contact 211 and the second contact 212) and the positioning slot 111 may be ensured, and the contacts may be prevented from being too high, which hinders the male head to be inserted into the female head.

Further, as shown in FIG. 2, in order to make the male head easier to insert into the mounting slot of the female head, in an embodiment of the present application, a mounting slot is disposed on the male head body outside the second pin 130, and the electrical conductor 110 is adaptively mounted in the mounting slot, so that the outer surface of the electrical conductor 110 is disposed flush with the outer surface of the male head body. In this way, the outer surface of the male head may be ensured to be flat, so that the male head may be easily inserted into the mounting slot of the female head.

Specifically, the electrical conductor 110 includes an electrical conductor disposed in an elongated shape and two side electrical conductors 110 disposed respectively at two ends of the electrical conductor and extending to one side; the mounting slot has a bottom wall and a side wall connected to the bottom wall, and an end surface of the two side electrical conductors 110 away from the electrical conductor body abuts on the side wall. The male head body is made of an insulating material such as plastic, and the molding process thereof is generally a injection molding process, and a molding slot may be directly formed on the male head body after molding. The electrical conductor 110 is made of a material having high conductivity such as copper, and its shape is adapted to the mounting slot, and may be fixed in the mounting slot by bonding, welding or the like.

Since the electrical conductor 110 includes a electrical conductor body and side electrical conductors disposed at two ends of the electrical conductor body, the contact area between the electrical conductor body and the mounting slot may be increased, thereby ensuring the stability of the electrical conductor 110 and the male head body after installation. However, the design of the present application is not limited thereto. In other embodiments, the electrical conductor 110 may further include only the electrical conductor body configured in an elongated shape.

Optionally, referring still to FIG. 2, the positioning slot 111 is opened on an end of the two side electrical conductors 110 away from the body of the electrical conductor 110. Specifically, the length of the side electrical conductor 110 is about half of the length of the side of the male head. Since the positioning slot 111 is opened on the end of the side electrical conductor 110 away from the electrical conductive body, the first contact 211 and the second contact 212 may be located in the middle of the side of the male head.

The present disclosure further provides a display device (not shown) including the logic board assembly, a specific structure of which may be understood with reference to the foregoing embodiments. Since all the technical solutions of all the above embodiments are adopted in the logic board assembly of the present application, at least all the advantages brought by the technical solutions of the foregoing embodiments are included and are not repeatedly described herein.

Specifically, the display device is a liquid crystal display, and the liquid crystal display comprises a backlight module, a liquid crystal display panel and a logic board assembly, wherein the liquid crystal display panel includes a plurality of data lines and a plurality of scan lines, and a plurality of pixel units defined by the data lines and the scan lines; wherein the logic board assembly includes a printed circuit board, a connector 200 disposed on the printed circuit board, a timing controller 300 and a power chip 400, and a connection cable 100 pluggably connected to the connector 200; the connector 200 is configured to be pluggably connected to the connection cable 100; one end of the connection cable 100 is pluggably connected to the connector 200, and the other end of the connection cable 100 is connected to a driving chip of the liquid crystal display panel (not shown); the driving chip is configured to provide a driving signal to the liquid crystal display panel.

It should be noted here that in other embodiments, the display device may also be an OLED display (organic electroluminescent diode display) or the like.

The connector 200 has a first state in good contact with the connection cable 100 and a second state in abnormal contact with the connection cable 100; the timing controller 300 includes a detecting device 310 and a control device 320; the detecting device 310 includes a signal transmitting end and a signal receiving end, and the signal transmitting end and the signal input end are electrically connected to the connector 200; the control device 320 includes a signal input end and a signal output end, the signal input end being electrically connected to the detecting device 310, the signal output end being electrically connected to the power chip 400 of the logic board assembly; when the connector 200 is in the first state, the control device 320 controls the power chip 400 to be turned on; when the connector 200 is in the second state, the control device 320 controls the power chip 400 to be turned off.

Since the display device provided by the present application may detect the connection reliability of the connection cable 100 and the connector 200 through the detection loop, the detection loop is turned off, and the timing controller 300 controls the power to be turned off when the connection cable 100 is inserted askew into or disconnected with the connector 200, thereby preventing the display screen from being abnormal or the driving chip from being burnt.

The above mentioned is only the alternative embodiment of the present disclosure, which does not limit the patent scope of the present disclosure, and any equivalent structure transformation made by using the specification and the drawings of the present disclosure or direct/indirect applications in other related technical fields should be contained in the scope of patent protection in a similar way.

What is claimed is:

1. A logic board assembly, wherein the logic board assembly comprises:
    a connector;
    a connection cable pluggably connected to the connector, the connection cable having a first state in good contact with the connector and a second state in abnormal contact with the connector; and,
    a timing controller including a detecting device and a control device;
    the detecting device includes a signal transmitting end and a signal receiving end, and the signal transmitting end and the signal receiving end are electrically connected to the connector;
    the control device includes a signal input end and a signal output end, the signal input end being electrically connected to the detecting device, the signal output end being electrically connected to a power chip of the logic board assembly; when the connection cable is in the first state, the control device controls the power chip to be turned on; when the connection cable is in the second state, the control device controls the power chip to be turned off;
    one of the connection cable and the connector is provided with a connecting member, and another of the connection cable and the connector is provided with an adapter; when the connector is in the first state, the connector is electrically connected to the adapter to form a detection loop for a detection signal to circulate;
    an electrical conductor is disposed on a male head of the connection cable, a female head of the connector is provided with a first contact and a second contact that are electrically and adaptively connected to the electrical conductor, and the electrical conductor is electrically connected to the first contact and the second contact when the male head of the connection cable is well connected to the female head of the connector, to control the detection loop to be turned on, and the detection loop is separated from pins on the male head or the female head.

2. The logic board assembly according to claim 1, wherein the female head includes a casing, a slot for adapting and plugging the male head is formed in the casing, and a plurality of first pins are disposed in the casing;
    the male head includes a male body and a plurality of second pins disposed on the male body, and the plurality of second pins are respectively disposed corresponding to the plurality of first pins.

3. The logic board assembly according to claim 1, wherein the first contact and the second contact are protruded from an inner wall of the casing, and the electrical conductor is provided with a positioning slot that is adapted to be positioned with the first contact and the second contact.

4. The logic board assembly according to claim 3, wherein a height of the first contact and the second contact protruding from the inner wall ranges from 0.25 mm to 1.25 mm.

5. A display device, wherein the display device comprises a backlight module, a liquid crystal display panel and the logic board assembly of claim 1, one end of the connection cable of the logic board assembly being pluggably connected to the connector, another end of the connection cable being connected to a driving chip of the liquid crystal display panel.

6. The display device according to claim 5, wherein the first contact and the second contact are protruded from an inner wall of a casing, and the electrical conductor is provided with a positioning slot that is adapted to be positioned with the first contact and the second contact.

7. A liquid crystal display, wherein the liquid crystal display comprises a backlight module, a liquid crystal display panel and the logic board assembly of claim 1, one end of the connection cable of the logic board assembly being pluggably connected to the connector, another end of the connection cable being connected to a driving chip of the liquid crystal display panel.

8. The liquid crystal display according to claim 7, wherein the first contact and the second contact are protruded from an inner wall of a casing, and the electrical conductor is provided with a positioning slot that is adapted to be positioned with the first contact and the second contact.

* * * * *